United States Patent  [11] 3,609,174

[72] Inventors Arthur G. Smith;
 Yung Ki Kim, both of Midland, Mich.
[21] Appl. No. 846,956
[22] Filed Aug. 1, 1969
[45] Patented Sept. 28, 1971
[73] Assignee Dow Corning Corporation
 Midland, Mich.

[54] W-TRICHLOROMETHYL-
 FLUOROALKYLSILANES
 4 Claims, No Drawings
[52] U.S. Cl. .................................................. 260/448.2 R,
 260/46.5 R, 260/448.2 H, 260/448.8 R,
 252/49.6 R
[51] Int. Cl. ..................................................... C07f 7/08,
 C07f 7/12
[50] Field of Search .............................................. 260/448.2
 R, 448.2 H, 448.8 R

[56] References Cited
UNITED STATES PATENTS

| | | | |
|---|---|---|---|
| 2,715,113 | 8/1955 | Gordon | 260/448.2 R |
| 2,800,494 | 7/1957 | Haluska | 260/448.2 R |
| 2,884,433 | 4/1959 | Smith | 260/448.2 R |
| 2,911,428 | 11/1959 | Tarrant | 260/448.2 R |
| 3,427,336 | 2/1969 | Tiers | 260/448.2 R |

Primary Examiner—Tobias E. Levow
Assistant Examiner—P. F. Shaver
Attorneys—Robert F. Fleming, Jr., Laurence R. Hobey and Harry D. Dingman ABSTRACT: Organopolysiloxanes, containing

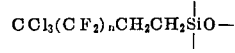

units, prepared from novel silanes such as $Cl_3C(CF_2)_2 CH_2CH_2Si(CH_3)X_2$, where X is OH or a hydrolyzable radical, are disclosed as nonflammable fluid lubricants and nonflammable elastomers.

W-TRICHLOROMETHYL-FLUOROALKYLSILANES

This invention relates to organosilicon compounds which contain both chlorine and fluorine atoms in the same substituent on the silicon atom. In one aspect, the invention relates to nonflammable polymers. In another aspect, the invention relates to silanes and siloxanes which contain a $CCl_3(CF_2)_nCH_2CH_2-$ substituent.

Fluorosilicone polymers, such as trifluoropropylmethylpolysiloxanes, are known for their thermal stability and solvent resistance. For example, fluorosilicone rubber retains its elastic properties over a wide temperature range and because of this characteristic has found application in a variety of environments. Fluorosilicone fluids also exhibit this high temperature stability and find use as lubricants.

One problem remaining in the area of fluorosilicone technology is that the polymers burn readily when, at high temperatures, they are exposed to an open flame. This tendency to burn and lack of ability to self-extinguish when removed from the flame limits the use of such polymers in environments where there is a high hazard of fire. This problem is overcome by the practice of the invention which provides nonflammable chlorine-containing fluorosilicone polymers.

Thus it is an object of the invention to provide novel organosilanes and organosiloxanes.

Another object of the invention is to provide nonflammable fluorosilicone polymers.

The silanes of the invention are of the formula $[CCl_3(CF_2)_nCH_2CH_2]_aSi(R)_bX_{4-a-b}$, in which
X is the hydroxyl group or a hydrolyzable radical;
R is a hydrogen atom, a monovalent hydrocarbon radical, a monovalent halohydrocarbon radical, in which the halogen is chlorine, bromine or iodine, or a $R_fCH_2CH_2-$ radical in which $R_f$ is a perfluoroalkyl radical of from 1 to 20 inclusive carbon atoms;
$n$ is an integer having a value of from 1 to 20 inclusive;
$a$ is an integer having a value of from 1 to 3; and
$b$ is an integer having a value of from 0 to 2, the sum of $a+b$ being no more than 3.

The siloxanes of the invention are homopolymers and copolymers containing at least one unit of the formula $[CCl_3(CF)_nCH_2CH_2]_a(R)_bSiO_{4-a-b}/2$, in which
R, $n$, $a$ and $b$ are as defined with respect to the silanes; any remaining units being of the formula $Z_cSiO_{4-c}/2$, in which
Z is a hydrogen atom, a hydroxyl group, a hydrolyzable radical, or an organic radical attached to the silicon atom by a Si—C bond, and
$c$ is an integer having a value of from 0 to 3 inclusive.

In the silanes of the invention, X can be the hydroxyl group (—OH) or any hydrolyzable radical such as halogen atoms, for example, iodine, chlorine and bromine; hydrocarbonoxy groups, such as methoxy, ethoxy, octadecyloxy, allyloxy, cyclohexyloxy, phenoxy, tolyloxy, benzyloxy, —OCH$_2$CH$_2$OCH$_3$ and

—(OCH$_2$CH)$_3$OC$_2$H$_5$
     |
     CH$_3$ acyloxy groups such as acetoxy, propionyloxy, benzoyloxy, cyclohexyloxy, and —OOCCH$_2$— O ; ketoxime groups such as —ON=C(CH$_3$)$_2$ and — ON S : amine groups such as —NH$_2$—N(CH$_3$)$_2$ and

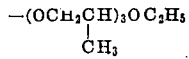

sulfide groups such as —SCH$_3$ and —S— O ; the nitrile group, the isocyanate group, sulfate groups such as

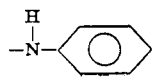

carbamate groups such as —OOCNHCH$_3$, —OOCH(CH$_3$)$_2$ and —OOCN(C$_2$H$_5$)$_2$ and groups such as —ON(CH$_3$)$_2$ and — ON(C$_3$H$_7$)$_2$. "Hydrolyzable group" as used in this specification is defined as a group which is removed from the silicon atom by reaction with water at room temperature to form a silanol.

As described above, R can be any monovalent hydrocarbon radical such as alkyl radicals, for example, methyl, ethyl, isopropyl, t-butyl, octadecyl, myricyl; cycloaliphatic radicals, for example, cyclohexyl, cyclopentyl and cyclohexenyl; aromatic hydrocarbon radicals, for example, phenyl, xenyl, and naphthyl; aralkyl hydrocarbon radicals such as benzyl, beta-phenylethyl and beta-phenylpropyl; and alkenyl radicals, for example, vinyl, allyl, hexenyl, butadienyl or other unsaturated groups including CH≡C—. When R is an unsaturated group it is best to add it to the silicon subsequent to the formation of the ≡SiCH$_2$CH$_2$(CF$_2$)$_n$CCl$_3$ structure. This can be done, for example, by reacting an unsaturated Grignard reagent (i.e. vinyl magnesium bromide) with ≡SiC1. The same or different R groups can be attached to the same silicon atom.

R can also be any radical of the formula $R_fCH_2CH_2-$ in which $R_f$ is a perfluoroalkyl radical such as CF$_3$, C$_2$F$_5$, C$_8$F$_{17}$, C$_{10}$F$_{21}$, (CF$_3$)$_2$CF— or

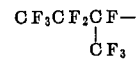

In addition, R can be any halohydrocarbon radical in which the halogen is Cl, Br or I, such as chloromethyl, gamma-chloropropyl, bromo-octadecyl, chlorocyclohexenyl, 3-chlorobutenyl-4, chlorophenyl, bromoxenyl, tetrachlorophenyl, p-chlorobenzyl, trichloropropyl and iodophenyl.

The silanes of the invention are obtained by reacting CCl$_3$(CF$_2$)$_n$Br with ethylene in the presence of a free radical catalyst, such as a peroxide, to obtain CH$_2$ClCH$_2$CCl$_2$(CF$_2$)$_n$Br, which in turn is dehydrochlorinated to produce CCl$_3$(CF$_2$)$_n$CH=CH$_2$. This olefin reacts with ≡SiHcompounds in the presence of platinum catalysts to yield the desired silanes. The method of preparation is illustrated in detail in the examples.

In addition to their utility as precursors to the siloxane polymers, these silanes can be used for the treatment of fibers or fabric to render the material more resistant to burning.

The silanols of the invention (i.e. where X is the hydroxyl group) are prepared by hydrolyzing the corresponding hydrolyzable silanes by any of the methods well known in the art. The preferred method of silanol preparation is by hydrolysis of those compounds in which X is the methoxy group.

The siloxanes of the invention can be prepared by partial or complete hydrolysis or cohydrolysis of the above-defined silanes by conventional means, or by cohydrolysis of the above silanes with silanes of the formula Z$_c$SiX (4−c)/2 where Z, X and $c$ are as defined above. The particular method chosen for the hydrolysis or cohydrolysis can vary widely depending upon the nature of the substituent groups on the silicon atom. Thus, there are no critical conditions other than the well-known methods for hydrolyzing and cohydrolyzing silanes.

As described above, the siloxanes can be homopolymers or they can be copolymers having various trichlorofluoroalkyl containing siloxane units. The siloxanes of the invention can contain also siloxane units of the formula Z$_c$SiO (4−c)/2 where $c$ has a value of from 0 to 3 inclusive. These included units of the type SiO$_2$, ZSiO$_{3/2}$, Z$_2$SiO and Z$_3$SiO$_{1/2}$. The same or different Z groups can be bonded to the same silicon atom.

Z can be a hydrogen atom, a hydroxyl group, any of the above defined hydrolyzable groups (X) or an organic radical attached to the silicon through an Si—C linkage, such as any of the monovalent hydrocarbon radicals specifically shown for R above; divalent hydrocarbon radicals, for example, methylene, dimethylene, —CH$_2$CH=CHCH$_2$— and octadecamethylene; arylene radicals, for example, phenylene, xenylene, tolylene, xylylene and napthylene; and cycloalkylene radicals such as cyclohexylene and cyclopentylene. Z can also be any halohydrocarbon radical, such as described with respect to R or the above described $R_fCH_2CH_2-$ radical.

Specifically included within the scope of the invention are siloxanes as described above which have olefin-containing siloxane units, such as $$\begin{array}{c} \text{ZSiO} \\ | \\ \text{CH} \\ \| \\ \text{CH}_2 \end{array}$$

The methylvinylsiloxane units are especially preferred. These olefin-containing siloxane units are usually present in amount in the range of from 0.1 to 10 mole percent to provide cross-linking sites.

The siloxanes of the invention are fluids, resins and elastomeric materials. The resin forms a hard film and can be used as a coating composition. The elastomers have particular utility as sealants in high temperature environments and have a high resistance to degradation upon exposure to radiation. The fluids are useful as lubricants and stable heat transfer media.

The following examples are illustrative of the invention which is delineated in the claims.

EXAMPLE 1

A mixture of 1,427 grams (4.8 moles) of $CCl_3CF_2CF_2Br$ and 49.1 grams (0.33 mole) of di-tertiarybutylperoxide was placed in a steel pressure vessel which was equipped with a stirrer, thermowell and cooling coil. After purging with ethylene and heating to 100° C., ethylene was charged to the system at a pressure of about 60 p.s.i. After initiation of the reaction, conditions were maintained at 130°–140° C. and 45–55 p.s.i. of ethylene pressure. The reaction was deemed complete after 6 hours, but stirring and reaction conditions were maintained overnight.

The reaction mixture contained about 50 percent starting material. Distillation of the reaction product gave $CCl_3CF_2CF_2CH_2CH_2Br$ as a major component, with some isomers being present. This product (910 grams) was added to a solution of 150 grams of KOH in 500 milliliters of ethanol to effect dehydrohalogenation. Total addition time was 1.5 hours. The mixture was stirred for about 12 hours at room temperature after which sufficient water to dissolve the potassium bromide was added. The aqueous and organic layers were separated and the organic layer was washed until neutral, dried and filtered. The product was distilled through a spinning band column to obtain 274 grams of $CCl_3CF_2CF_2CH{=}CH_2$ having the following properties:

Boiling point of 52° C./3 mm. Hg. $n_D^{25}$ of 1.4056 and $d_4^{25}$ of 1.508.

The structure was confirmed by infrared, $H^1$ NMR and $F^{19}$ NMR spectral data. A minor amount of $BrCF_2CF_2CCl_2CH{=}CH_2$ was also recovered.

EXAMPLE 2

Dichloromethylsilane was added dropwise to 200 grams of $CCl_3CF_2F_2CH{=}CH_2$ and 0.5 milliliters of 0.1 molar chloroplatinic acid in isopropanol. The reaction was carried out at 120°–130° C. A total of 130 grams of $HSi(CH_3)Cl_2$ was added during a period of 24 hours, after which the reaction mixture was stirred and maintained at about 105° C. overnight. The reaction mixture was distilled at reduced pressure to yield 239 grams of $CCl_3CF_2CF_2CH_2CH_2Si(CH_3)Cl_2$. This product had a boiling point of 131° C./24 mm. Hg. $n_D^{25}$ of 1.4415 and $d_4^{25}$ of 1.5212. The structure was confirmed by $H^1$ and $F^{19}$ NMR and infrared spectral data.

EXAMPLE 3

The dichlorosilane product of Example 2 was hydrolyzed by adding 66 grams of the material in 100 milliliters of ether to 200 milliliters of water. The mixture was stirred for 1 hour after the addition. After separation of the aqueous and organic layers, the organic portion was washed with a dilute aqueous sodium bicarbonate until neutral, then dried and filtered. The solvent was removed by evaporation to give a fluid of the formula $CCl_3CF_2CF_2CH_2CH_2Si(CH_3)(OH)_2$.

The same product was also obtained by a buffered hydrolysis technique, wherein the dichlorosilane was added to a sodium bicarbonate solution.

EXAMPLE 4

A portion of the hydrolyzate of Example 3 was heated to about 100° C. and treated with 4 drops of tetramethylguanidine in trifluoroacetic acid (1:3 mols) which acts as a condensation catalyst. After about 40 minutes of stirring, the condensation product became quite viscous and the reaction was stopped by allowing the flask to cool.

The product, a hydroxyl-endblocked polymer of units of the formula $$(CCl_3CF_2CF_2CH_2CH)(CH_3)SiO-$$

was fluid having a viscosity in excess of 5,000 cs.

A portion of this product was milled with a small amount of vinyltriacetoxysilane (cross-linking agent) and dibutyltin diacetate (catalyst). The material was cured by exposure to the atmosphere to give a white elastomeric gum, which was suitable as a sealant. The cured material was placed in an open container and a flame was applied to the polymer surface. When the flame was removed, the polymer self-extinguished. This is to be contrasted with 3,3,3-trifluoropropylmethylpolysiloxanes which burn readily to give a white ash when tested in this manner.

EXAMPLE 5

About 75 grams of the hydrolyzate obtained by the buffered hydrolysis of Example 3 was dissolved in 100 milliliters of cyclohexane and the cyclohexane solution was refluxed for 1 hour to remove any traces of water. Then, 39 grams of hexamethyldisilazane were added and refluxing was continued for 24 hours. After cooling the reaction mixture, 100 milliliters of ether were added and the solution was washed with dilute hydrochloric acid. After washing with a dilute sodium bicarbonate solution and then water until neutral, the product was dried and stripped of solvent to give a viscous fluid polymer of the formula $$(CH_3)_3SiO {-}{\left\{\begin{array}{c} CH_3 \\ | \\ SiO \\ | \\ CH_2 \\ | \\ CH_2 \\ | \\ CF_2 \\ | \\ CF_2 \\ | \\ CCl_3 \end{array}\right\}}_n {-} Si(CH_3)_3.$$

That which is claimed is:
1. Organosilicon compounds of the formula $CCl_3(CF_2)_n CH_2CH_{2-a}Si(R)_bX_{4-a-b}$, in which X is the hydroxyl group or a hydrolyzable radical;
R is a hydrogen atom, a monovalent hydrocarbon radical, a monovalent halohydrocarbon radical in which the halogen is chlorine, bromine or iodine, or a $R_fCH_2CH_2-$, in which $R_f$ is a perfluoroalkyl radical or from 1 to 20 inclusive carbon atoms;
n is an integer having a value of from 1 to 20 inclusive;
a is an integer having a value of from 1 to 3 inclusive; and $b$ is an integer having a value of from 0 to 2 inclusive, the sum of $a+b$ being no more than 3.

2. The compound of claim 1 wherein $n$ equals 2.

3. The compound of claim 1 wherein R is a methyl radical and $b$ equals 1.

4. The silane of claim 1 of the formula $CCl_3(CF_2)_2CH_2CH_2Si(CH_3)Cl_2$.

U.S. PATENT OFFICE
UNITED STATES PATENT OFFICE
CERTIFICATE OF CORRECTION

Patent No. 3,609,174            Dated: September 28, 1971

Arthur G. Smith and Yung Ki Kim

It is certified that errors appear in the above identified patent and that said Letters Patent are hereby corrected as shown below:

Col. 1, line 28 - within the formula ..."$X_{4_1a_1b}$" should read "$X_{4-a-b}$"

Col. 1, line 41 - the formula "$\{CCl_3(CF)_nCH_2CH_2\}_a(R)_bSiO_{4_1a_1b}/2$" should read "$\{CCl_3(CF_2)_nCH_2CH_2\}_a(R)_bSiO_{4-a-b}/2$"

Col. 1, line 43 - the formula "$Z_cSiO_{4_1c}/2$" should read "$Z_cSiO_{4-c}/2$"

Col. 1, line 60 - "-OOCCH$_2$- O " should read "-OOCCH$_2$-"

Col. 1, line 61 - at the center of the line "-ON S" should read "-ON=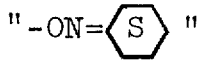"

Col. 1, line 67 - "-S- O" should read "-S-"

Col. 1, line 74 - at the end of the line "-OOCH(CH$_3$)$_2$" should read "-OOCN(CH$_3$)$_2$"

Col. 3, line 53 - the formula "$CCl_3CF_2CF_2CH\ CH_2$" should read "$CCl_3CF_2CF_2CH=CH_2$"

Col. 3, line 66 - the formula "$CCl_3CF_2F_2CH=CH_2$" should read "$CCl_3CF_2CF_2CH=CH_2$"

Col. 4, line 67 and 68 - the formula "$CCl_3(CF_2)_nCH_2CH_{2_a}Si(R)_bX_{4_1a_1b}$" should read $$CCl_3(CF_2)_nCH_2CH_2\ _aSi(R)_bX_{4-a-b}$$

Signed and sealed this 26th day of December 1972.

(SEAL)
Attest:

EDWARD M. FLETCHER, JR.        ROBERT GOTTSCHALK
Attesting Officer               Commissioner of Patents